United States Patent [19]

Force

[11] Patent Number: 4,460,484

[45] Date of Patent: Jul. 17, 1984

[54] TERTIARY OIL RECOVERY SURFACTANTS

[75] Inventor: Carlton G. Force, Mt. Pleasant, S.C.

[73] Assignee: Westvaco Corporation, New York, N.Y.

[21] Appl. No.: 367,347

[22] Filed: Apr. 12, 1982

[51] Int. Cl.³ .............................................. E21B 43/22
[52] U.S. Cl. ............................. 252/8.55 D; 166/274; 166/275
[58] Field of Search .................. 252/8.55 D; 166/274, 166/275

[56] References Cited

U.S. PATENT DOCUMENTS

| | | | |
|---|---|---|---|
| 2,678,934 | 5/1954 | Grummitt | 260/404.8 |
| 3,714,062 | 1/1973 | Askew et al. | 252/308 |
| 4,194,565 | 3/1980 | Kalfoglou | 166/275 |
| 4,196,134 | 1/1980 | Ball et al. | 260/404.8 |
| 4,299,711 | 11/1981 | Tyler et al. | 252/8.55 |

OTHER PUBLICATIONS

Joseph J. Taber, "Research on Enhanced Oil Recovery: Past, Present and Future," *Pure & Appl. Chem.*, vol. 52, pp. 1323–1347, (1980).

*Primary Examiner*—Christine M. Nucker
*Attorney, Agent, or Firm*—Terry B. McDaniel; Richard L. Schmalz

[57] ABSTRACT

Emulsified oil-water solutions produced from certain vegetable oil adducts having hydrophilic functional groups and fresh water or dilute brine are disclosed as well as the application of such solutions in surfactant flooding tertiary oil recovery operations.

6 Claims, No Drawings

TERTIARY OIL RECOVERY SURFACTANTS

BACKGROUND OF THE INVENTION

1. Field of the Invention

This invention relates to emulsified oil-water solutions produced from certain vegetable oil adducts having hydrophilic functional groups and fresh water or dilute brine and to the application of such solutions in surfactant flooding oil recovery operations.

2. Description of the Prior Art

Initially, petroleum is forced from the well by the underground pressures exerted upon it by its lower molecular weight gaseous fraction. When the pressure creating this free flow diminishes, a pump is put on the well head and the remainder of the petroleum in the trap cavity is pumped out.

This total volume recovered by primary pumping means usually represents no more than 10% to 40% of the total petroleum available in that particular field. Most of the remainder is present in the porous rock structure.

Secondary recovery such as injecting water down at least one well penetrating a subterranean, petroleum-containing formation, referred to as an injection well, can again produce pressure in the formation. This displaces another 10% to 20% of the more easily removed petroleum from the capillary pores allowing it to be recovered to the surface of the earth by at least one production well also penetrating the same subterranean, petroleum-containing formation.

Up to two-thirds of the original petroleum still remains unrecoverable by these means. As early as 1927, it was found that surfactants considered at that time to be wetting agents used in Pennsylvania sandstone reservoirs permitted recovery of some of this residual oil. Other studies have uncovered the observation that if the capillary walls in the porous rock could be wet with water instead of petroleum, the so-called tertiary petroleum, recovery was much improved. In 1917 U.S. Pat. No. 1,249,232 taught that addition of alkaline materials to water used to flood reservoirs improves petroleum recovery. It is now speculated that the alkaline material may interact with the naturally occurring organic acids in the petroleum to generate surfactant wetting agents in situ. Strong acids also are capable of reversing the wettability of rocks from oil wet to water wet, but the carbonate present in reservoir rock consumes so much acid that this approach is usually economically unattractive.

Based on these early and subsequent studies, the residual oil removal problem has been defined to be the result of capillary action within the narrow pores. In other words, in the confines of the small diameter of the capillary pores, the surface forces between the fluids far exceed the viscous forces which are available from waterflooding gradients in the reservoir. This insight has led to the current state of the art where much effort is being expended on methods of reducing the magnitude of the surface forces which hold oil back during a displacement process.

Quantification of the viscous to surface force relationships began in 1935 and, little more than a decade ago, a simplified measure which quickly shows one advantage of this invention was developed. In this 1969 study, it was demonstrated that no oil could be displaced until a critical value of $\Delta P/L\sigma$ (Equation 1) was reached, where $\Delta P$ is the pressure drop over the distance $L$ and $\sigma$ is the oil-water interfacial tension. This critical value was found to be about 2 to 5 psi/ft/dyne/cm for Berea sandstone by Taber (*Society of Petroleum Engineering Journal*, Volume 9, 3-12 (1969)) for whom these values for different porous media are now named.

Efforts to modify the surface forces of the fluids in capillaries can be classified into three broad and often overlapping areas, i.e., attempts to: (1) change wettability, (2) change interfacial tension, referred to as surfactant flooding, or (3) remove the interface entirely (miscible flooding). Undoubtedly, changes in wettability are interacting in each of the other two approaches because of the surfactants and solvents employed. However, wettability measurements by themselves are difficult to quantify in the rough walled capillary systems which make up the porous media in which petroleum is entrapped. Thus, progress in efforts made solely to understand and utilize this approach is still being sought.

Reducing the interfacial tension between petroleum and water through the formation of a clear, so-called microemulsion has been explored since 1944 (U.S. Pat. No. 2,356,205). Marathon Oil Company has been particularly successful with this approach commercially utilizing concepts based on U.S Pat. No. 3,254,714. In such systems, a sulfonate surfactant containing an alkyl chain in its structure and a short chain alcohol are usually blended. When added to a two phase hydrocarbon-water system, a third, nearly clear, microemulsion phase will form in the interface if the equivalent alkane carbon number (EACN) of the hydrocarbon is adequate so that the surfactant-cosurfactant combination produces ultralow interfacial tension ($<10$ millidynes/cm) between the phases. A specific concentration of electrolyte is usually required in the aqueous phase to minimize the interfacial tension to values most generally no lower than 0.1 millidyne/cm.

Thus, the object of this invention is to provide surfactants for surfactant flooding oil recovery operations which are capable of reducing the interfacial tension between water and the appropriate EACN hydrocarbons to the $10^{-3}$ dynes/cm range. Another object of the invention is to provide a method for tertiary oil recovery employing the invention surfactants. A further object is to provide tertiary oil recovery surfactants the interfacial tension reducing capabilities of which are relatively insensitive to the aqueous phase electrolyte concentration.

SUMMARY OF THE INVENTION

It has been discovered that certain vegetable oil adducts having hydrophilic functional groups are capable of reducing the interfacial tension between water and the appropriate EACN hydrocarbons to the $10^{-3}$ dynes/cm range, preferably to the $10^{-5}$ dynes/cm range. Employed in surfactant flooding oil recovery operations, the electrolyte concentration of the aqueous phase brine also has little effect upon the interfacial tension achieved. The vegetable oil adducts which meet the objects stated contain particularly the carboxylate, ethoxylate, sulfonate, sulfate, phosphate or phosphate ester functional groups. The vegetable oils from which the invention surfactants are prepared contain polyunsaturated fatty acid ester groups in the triglyceride molecule, such as soybean, cottonseed, corn, safflower and sunflower oils.

DESCRIPTION OF THE PREFERRED EMBODIMENTS

The hydrophilic functional group containing surfactants of this invention are based on the Diels Alder reaction products of vegetable oils having polyunsaturated fatty acid ester groups in the triglyceride molecule, or the alkali metal salts of said reaction products.

For example, the carboxylate containing vegetable oil adducts can be the triglyceride acids of the general formula

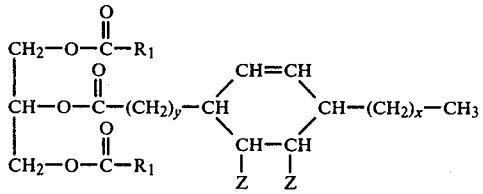

wherein x and y are integers from 3 to 9, x and y together equal 12, at least one Z is a carboxylic acid group and any remaining Z is hydrogen, and $R_1$ and $R_2$ are saturated/unsaturated hydrocarbon radicals. These triglyceride acids may be converted into their soap or salt form by various neutralizing agents, in which case the same general formula applies except at least one Z is COOM and any remaining Z is hydrogen and M is a member of the group consisting of sodium, potassium, lithium, ammonium and organic amines.

The triglyceride acids of the general formula may be prepared via Diels Alder addition as the mono acrylic acid adduct of vegetable oil where only one Z is a carboxylic acid group as taught in U.S. Pat. No. 4,196,134, or it may be prepared via Diels Alder addition as the fumaric acid adduct of vegetable oil where both Zs are carboxylic acid groups as taught by U.S. Pat. No. 2,678,934.

The ethoxylate containing vegetable oil adducts can be prepared simply by reacting the desired molar ratio of ethylene oxide with the triglyceride acids of the general formula.

Another example of the vegetable oil adducts of this invention is the monosulfonate Diels Alder adduct surfactant prepared by reacting equal gram molecular weights of soybean oil and sodium vinyl sulfonate in a similar manner as the acrylic acid addition taught in U.S. Pat. No. 4,196,134.

These and other hydrophilic functional group containing vegetable oil adducts, when in solution with fresh water or dilute brine, are effective tertiary oil recovery surfactants when employed in surfactant flooding oil recovery operations.

Thus, a method is disclosed for recovering petroleum from a subterranean, petroleum-containing formation penetrated by at least one injection well and by at least one production well, comprising injecting an aqueous fluid containing an ultralow interfacial tension producing amount of at least one vegetable oil adduct having hydrophilic functional groups wherein the vegetable oil adduct or adducts are the Diels Alder addition products of vegetable oils having polyunsaturated fatty acid ester groups in the triglyceride molecule.

The ultralow interfacial tensions achievable with the invention surfactants are shown in the following examples.

EXAMPLE 1

A disodium salt of the fumaric acid adduct of vegetable oil was prepared by adding 23 ml of 1 normal NaOH to 7.9997 gms of the adduct having an Acid Number of 114.8 in a 100 ml volumetric flask diluting with about 60 ml of distilled water and heating until completely dissolved. The solution at room temperature was then diluted to exactly 100 ml with distilled water.

Into a 1 oz screw cap bottle was measured 0.8435 ml of the above disodium salt of the fumaric acid adduct of vegetable oil solution, 0.208 ml of 30.0% NaCl solution and 3.949 ml of distilled water. To the bottle was then added 5.0 ml of n-nonane.

The bottle was closed with the plastic cap and shaken for 13 days on an Eberbach platform shaker to help hasten equilibration of the contents. At the end of this period, the system consisted of a large volume of a turbid middle phase emulsion. The phase above this middle phase was water clear while the phase below was slightly turbid with as yet unseparated middle phase emulsion.

A sample of the lower phase was transferred to a precision bored capillary spinning drop apparatus sample tube whose lower end had been permanently sealed with blown glass. This tube was centrifuged at 3000 RPM for about Z20 minutes in a Clay Adams Safety Head Centrifuge to separate the turbid emulsion from the lower phase. With a hypodermic syringe, most of the emulsion layer was removed from the solution surface and replaced with lower phase also centrifuged clear at the same time, but in a different container.

The capillary tube was then placed in the sample holder of a Spinning Drop Interfacial Tensiometer manufactured by the University of Texas at Austin. Upon spinning horizontally for 2 hours at 6,000 revolutions per minute and room temperature, the emulsion layer had spread into a thin black cylinder along the center axis of the tube. The diameter of this cylinder was $2.958 \times 10^{-4}$ cm. From the equations presented in a chapter by Cayias, Schechter and Wade in *American Chemical Society Symposium Series*, volume 8, page 237 (edited by K. L. Mittal), this diameter cylinder containing emulsified nonane represents an interfacial tension of 0.27 millidyne/cm.

It was impossible to measure the interfacial tension between the middle phase emulsion and the clear upper phase because light was so scattered by the bulk middle phase emulsion that it was black in appearance and the clear upper phase cylinder along the center axis of the tube could not be distinguished through it. Spinning drop equilibration of a drop of the clear upper phase in the bottom phase produced an interfacial tension of 860 millidynes/cm suggesting that most of the surfactant is probably located in the middle phase emulsion.

EXAMPLE 2

Various molar ethoxylates of the fumaric acid adduct of vegetable oil were prepared. These were utilized as the surfactant for several systems each consisting of water and a different hydrocarbon. Sample preparation and measurement was similar to Example 1 except that 0.2 gm of each ethoxylate was weighed into the screw cap bottle first then followed by sufficient water to make a total of 5 grams. There was no sodium chloride added to these systems. Exactly 5.0 ml of the particular hydrocarbon was pipetted into the bottle last. The interfacial tension results of the middle phase turbid emulsion in the lower phase are shown in the following table.

| Ethoxylate | Interfacial Tension in Millidynes/Cm | | | | |
|---|---|---|---|---|---|
| | n-octane | n-nonane | n-decane | n-dodecane | n-tetradecane |
| 2 mole | 0.024 | 1.38 | 0.275 | 0.340 | 24.4 |
| 3 mole | — | 0.46 | — | 0.666 | — |
| 5 mole | 54.2 | 0.125 | 2.38 | 32.7 | — |
| 10 mole | 25.7 | 4.64 | 0.275 | 2.92 | 1.26 |

EXAMPLE 3

Nine samples of smaller concentrations of the 5 mole ethoxylate in Example 2 were weighed into bottles making them up in the same manner as Example 2 with n-nonane as the hydrocarbon. At all concentrations of the surfactant studied between the 2% concentration prepared in Example 2 and 0.03% based on the entire volume of the system, three phase systems formed where the middle phase was a turbid emulsion. As mentioned earlier, such 3 phase systems are characteristic of millidyne per centimeter, or lower, interfacial tensions. The 0.3% system had a spinning drop interfacial tension of 0.058 millidyne/cm and the 1.7% system an interfacial tension of 0.0049 millidyne/cm between the lower phase and the turbid middle phase.

EXAMPLE 4

Starting with equal gram molecular weights of soybean oil and sodium vinyl sulfonate, the monosulfonate Diels Alder adduct was prepared according to a procedure similar to that described in U.S. Pat. No. 4,196,134 for acrylic acid Diels Alder adducts of soybean oil. When systems were equilibrated in the same manner as Example 2, the n-dodecane-monosulfonate adduct of soybean oil-water system showed a spinning drop interfacial tension measurement of 0.056 millidyne/cm. A similarly prepared system with tetradecane as the hydrocarbon had an interfacial tension of 0.024 millidyne/cm. From these examples, it is seen that this class of soybean oil based surfactants is capable of reducing the interfacial tension between the aqueous phase and the turbid emulsion middle phase to very low values. When such low interfacial tension values are utilized in calculating capillary numbers as expressed by Equation 1, the capillary number becomes relatively large at low applied pressures. In practice, it has been found that larger capillary number reservoir floods tend to produce greater recovery of the oil being displaced by the water. In other words, the capillary forces have been reduced adequately so that less viscous force pressure is required to achieve the critical value of $\Delta P/L\sigma$ where oil begins to be displaced.

While the invention has been described and illustrated herein by references to various specific materials, procedures and examples, it is understood that the invention is not restricted to the particular materials, combinations of materials, and procedures selected for that purpose. Numerous variations of such details can be employed, as will be appreciated by those skilled in the art.

What is claimed is:

1. A method for recovering petroleum from a subterranean, petroleum-containing formation penetrated by at least one injection well and by at least one production well, comprising injecting an aqueous fluid containing an ultralow oil-water interfacial tension producing amount of at least one vegetable oil adduct surfactant having hydrophilic functional groups, said vegetable oil adduct being the Diels Alder addition product of a vegetable oil having polyunsaturated fatty acid ester groups in the triglyceride molecule.

2. The method of claim 1 wherein the vegetable oil adducts are prepared from the vegetable oils selected from the group consisting of soybean, cottonseed, corn, safflower and sunflower oils.

3. The method of claim 1 wherein the hydrophilic functional groups are selected from the group consisting of the carboxylate, ethoxylate, sulfonate, sulfate, phosphate and phosphate ester functional groups.

4. The method of claim 3 wherein the vegetable oil adduct is the triglyceride acid of the general formula

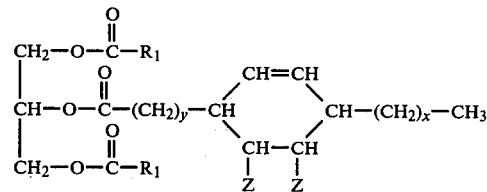

wherein x and y are integers from 3 to 9, x and y together equal 12, at least one Z is a carboxylic acid group and any remaining Z is hydrogen, and $R_1$ and $R_2$ are saturated/unsaturated hydrocarbon radicals.

5. The method of claim 3 wherein the vegetable oil adduct is the triglyceride acid of the general formula

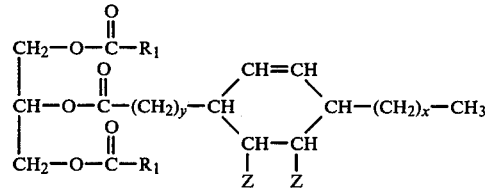

wherein x and y are integers from 3 to 9, x and y together equal 12, at least one Z is COOM and any remaining Z is hydrogen, and M is a member of the group consisting of sodium, potassium, lithium, ammonium and organic amines.

6. The method of claims 1, 2, 3, 4 or 5 wherein the vegetable oil adduct surfactant is added in an amount sufficient to reduce the oil-water interfacial tension to the $10^{-5}$ dyne/cm range.

* * * * *